Nov. 25, 1952 R. H. DAVIES ET AL 2,619,103
SPEED AND ANEROID CONTROLLED PILOT OPERATED VALVE
Filed Jan. 31, 1947 2 SHEETS—SHEET 2
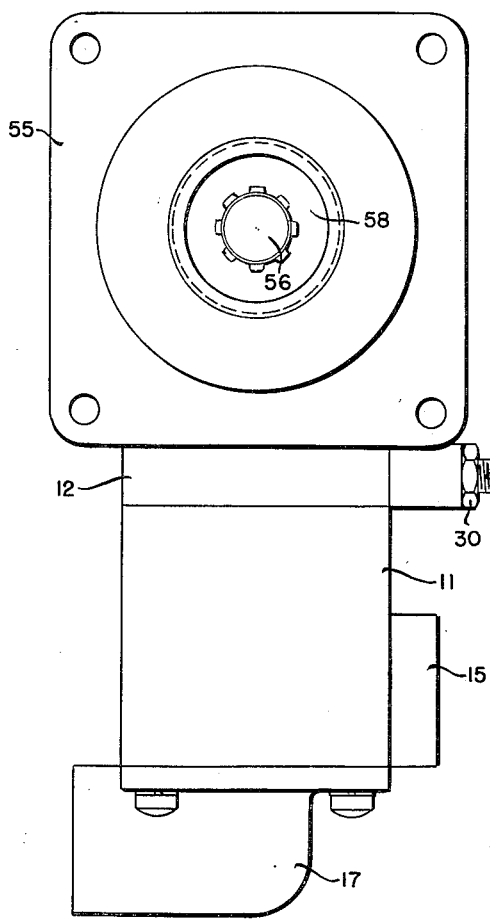
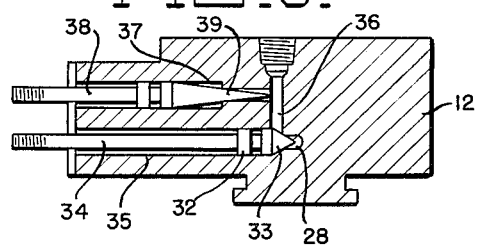
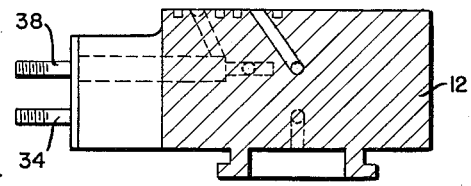
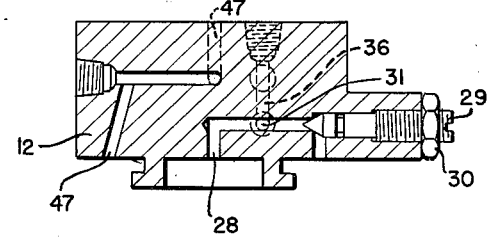
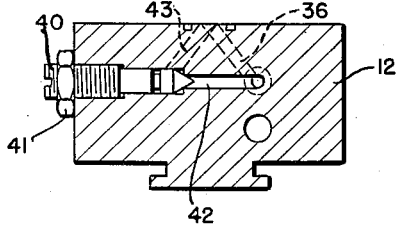
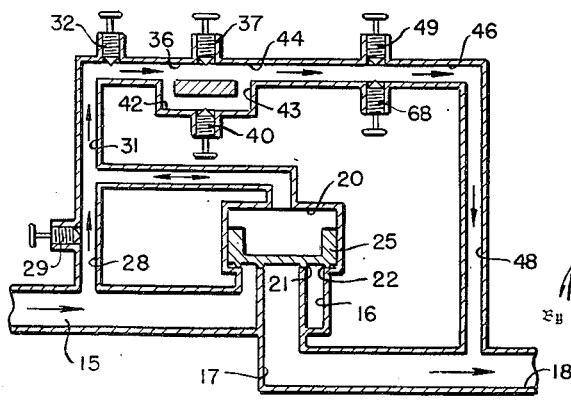
Inventors
R. C. Davies and E. C. Hartley
By Mason Porter Miller & Stewart
Attorneys Patented Nov. 25, 1952

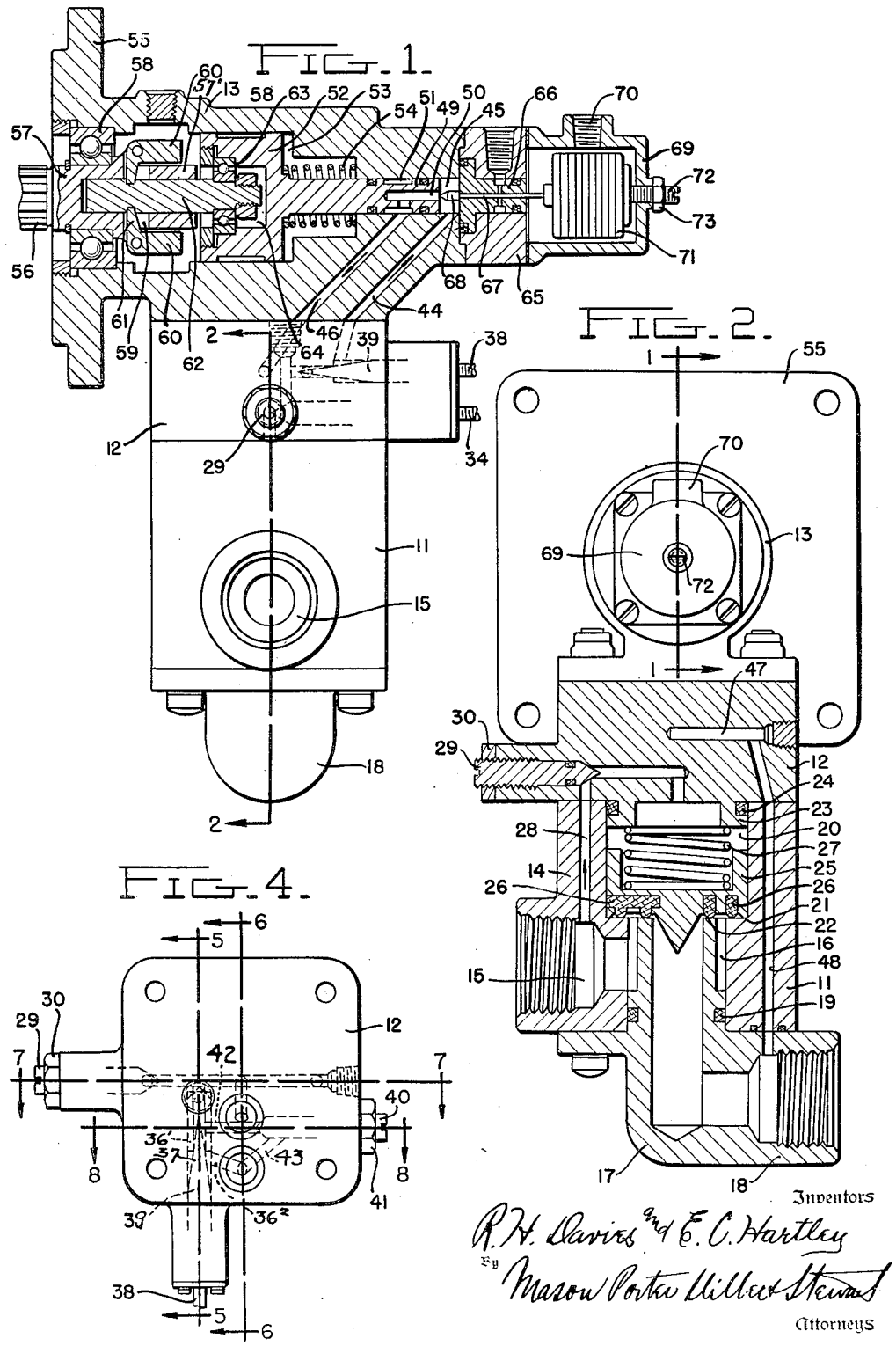

2,619,103

UNITED STATES PATENT OFFICE 2,619,103

SPEED AND ANEROID CONTROLLED PILOT OPERATED VALVE

Robert H. Davies, Bedford, and Emmett C. Hartley, Euclid, Ohio, assignors to The Parker Appliance Company, Cleveland, Ohio, a corporation of Ohio Application January 31, 1947, Serial No. 725,640

5 Claims. (Cl. 137—51)

The invention to which the following specification relates is an improvement in the automatic control of speed of turbo-jet engines, particularly those utilized in aviation by aneroid response to changes in atmospheric pressure.

Due to the rarefaction of the air and constant lightening of the load on the supercharger as altitude is gained, the rotational speeds of turbojet engines tend to increase even when the throttle setting remains constant. As flying speed is proportional to the rotational speed of the engine regardless of the altitude changes, means must be employed to compensate for the effect of the altitude in order to maintain a uniform or predetermined flying speed. Ordinarily, the aviator must manipulate the throttle by hand in order to keep his flying speed uniform. It is most desirable that this control be effected without attention from him. To hold the speed constant with increase in altitude and without disturbing the setting of the throttle control valve, automatic means may be provided for restricting the flow of fuel through the main valve by changes in a pilot stream actuating the main valve.

The complete control system for a turbo-jet engine to compensate for changes in altitude demands an independent shut-off valve, a throttle valve, a governor actuated control valve and a regulating valve actuated by changes in atmospheric pressure (an aneroid). All of these serve to control the main fuel valve. In doing this it is desirable that all except the independent shut-off valve be sequentially arranged on a by-passing pilot fuel line obtained from the same source feeding the main valve and serving to actuate the latter.

It is important that this equipment be easy to install, economical of space and certain in operation.

One object of our invention is to provide automatic means to control the main fuel feeding valve so that a predetermined rotational speed is maintained regardless of change in atmospheric pressure (altitude).

Another object of our invention is to combine such controlling means with a centrifugal speed governor.

A further object of our invention is to actuate the main fuel feeding valve by variation in a pilot line controlled by change in atmospheric pressure.

Among the objects of our invention is to provide for accurate and precise calibration of the throttle control valve without disturbing the joint atmospheric-speed control. This is done by by-passing a portion of the pilot or control flow around the throttle valve and thus giving it greater sensitivity.

A still further object of our invention is to provide an assembly for carrying out the above purposes that shall be compact and form a single installation unit.

Other advantages of our improved mechanism will be evident from the following detailed description of the structure amplifying the invention.

In order to illustrate our invention we have shown the preferred form on the accompanying drawing in which;

Fig. 1 is a side elevation of the assembly shown partly in section on the line 1—1 of Fig. 2 for controlling a fuel valve by atmospheric pressure through an aneroid device;

Fig. 2 is a right end elevation of the same shown partly in section on the line 2—2 of Fig. 1;

Fig. 3 is a left end elevation;

Fig. 4 is a top plan view of the valve cover plate;

Fig. 5 is a vertical section through the cover plate on the line 5—5 of Fig. 4;

Fig. 6 is a vertical section through the cover plate on the line 6—6 of Fig. 4;

Fig. 7 is a vertical section through the cover plate on the line 7—7 of Fig. 4;

Fig. 8 is a vertical section through the cover plate on the line 8—8 of Fig. 4 and Fig. 9 is a schematic diagram of the fuel flow and its controlling devices.

The invention resides in part in a compact convenient and unitary mounting of a valve assembly 11, a valve cover plate 12 and a regulator housing 13. The valve assembly is adapted to control the flow of the fluid fuel received under relatively high pressure and its delivery to an outlet which directs it to the engine.

The valve cover plate, in turn, provides means for actuating the main fuel valve and controlling it subject to a shut-off valve, an adjustable throttle valve and an adjustable throttle by-pass. The regulator housing is directly mounted above the valve cover plate and serves as a means by which both the cover plate and the valve assembly are suspended in operative relationship. The regulator housing provides for conjoint control of the main valve by a centrifugal speed governor and by variations of atmospheric pressure operating through an aneroid bellows.

The valve assembly 11 comprises a valve body 14. One side of the body 14 has an inlet port 15 through which fluid fuel is delivered at considerable pressure. This may be provided by a centrifugal pump or the like which will deliver fuel at a pressure of approximately 500 pounds per square inch.

The body 14 has a vertical valve chamber 16 which receives the fluid fuel under pressure. An outlet fitting 17 forms a tight closure to the bottom of the throat 16. The fitting extends laterally to provide an outlet 18 by which the fuel is delivered to the jet engine or similar power plant. The fitting 17 has a leak-proof gasket 19 which will prevent escape of the fuel from the throat 16 around the fitting.

The upper portion of the throat 16 is enlarged to form the chamber 20. The bottom end of this chamber 20 forms an annular valve seat 21 and the end of the fitting 17 is in the same plane to form a similar inner valve seat 22.

The chamber 20 is closed at the top by means of the valve cover plate 12 wihch has a depending flange 23 and a leak-proof gasket 24.

The chamber 20 carries a main valve in the form of a freely slidable piston 25. The bottom face of this valve 25 has a plurality of valve facings 26, 26. These project in concentric circles and register with the valve seats 21, 22.

A coil spring 27 rests between the piston valve 25 and the flange 23. This spring is of such strength that when the pressure of the incoming fuel is the same on opposite sides of the piston, the latter will be held tightly against the valve seats 21, 22.

Pressure of the fuel from the inlet port 15 is applied against the top of the valve 25 by means of the passageway 28 leading from the inlet port 15 and through the cover plate 12 to within the flange 23. The effective valve area exposed in the chamber 20 exceeds the area between the valve facings so that when the full inlet pressure builds up in chamber 20 the main valve will remain closed.

As shown in Fig. 2, an adjustable metering needle valve 29 is screw threadedly carried in the cover plate 12 and may be set to control the rate of delivery of the pilot fuel supply above the piston 25. Lock nut 30 is used to hold the needle valve in a predetermined position.

The rise of the main piston valve 25 and delivery of fuel to the outlet port 18 is effected by the reduction of the fluid pressure on the top of this valve. This is accomplished by providing in the cover plate an outlet passage 31 from the passage 28 beyond the metering valve 29 as shown in Fig. 7.

Discharge from the passageway 31 is directed past a shut-off valve 32. This valve 32 is in the form of a pointed head 33 carried on a shaft 34 and slidable in a bearing 35. This shut-off valve is under manual control of the operator and can be closed when necessary.

A duct 36 leads from the pipe 28 past the valve 32. The duct 36 has two branches 36¹ and 36² as indicated in Fig. 4. The normal flow is through a throttle valve 37. This has a valve stem 38 and a conical head 39. The head 39 rests against the end wall of the duct 36. Normally the valve is retracted to permit a discharge of actuating fuel at a rate in excess of the volume passing the metering valve 29. By adjustment in position of the valve 37 it is possible thus to reduce the fluid pressure above the main piston valve 25 and allow the latter to rise due to the pressure of incoming fuel and fuel is thus delivered directly to the outlet port 18.

The controlling fluid may also be caused to by-pass the throttle valve 37 by means of an adjustable by-pass valve 40 (Fig. 8). This consists of a screw-threaded needle valve held in adjusted position by means of lock nut 41 and controlling the discharge of control fluid through passageway 42 and passageway 43. Passageways 42 and 43 by-pass passageway 36.

Both passageways 36 and 43 discharge the control fluid to the regulating unit 13. The regulating unit has a passageway 44 leading from the passageways 36 and 43 up to a valve chamber 45. A discharge passage 46 returns fluid from the valve chamber 45. Passageway 46 delivers to a continuation bore 47 in the valve cover which, in turn, leads through vertical passage 48 to the outlet port 18.

A sliding valve 49 is carried in the valve chamber 45. It has an axial opening 50 open at one end and connected to the other to a ring groove 51. The groove 51 registers with passageway 46 when the piston is moved out of registry with passage 44.

The inner end of the piston valve 49 is enlarged as at 52 and slides within a piston cylinder 53. A spring 54 resting against the end wall of the chamber 53 and the enlarged piston 52 serves to maintain the latter in normally open position.

The regulator housing 13 has an end flange 55 by which it is bolted to the engine structure in such manner that a ring gear, not illustrated, driven by the turbo-jet engine may be used to drive a pinion 56 (Fig. 1). This pinion 56 is mounted on a shaft 57 revoluble in ball bearings 58 of the housing 13. The inner end of the shaft 57 is formed with an axial opening providing a collar 57'. This collar is slotted on opposite sides as shown in 59 and opposed fly-weights 60, 60 are pivoted on the shaft 57. The inner end of the fly-weights 60, 60 form levers 61 projecting within the axial recess of the shaft 57.

A control rod 62 slides longitudinally in the recess of the shaft 57 and is notched or grooved at its inner end to receive the levers 61, 61.

The inner end of the rod 62 projects beyond the collar 58 and carries a ball bearing 63. The outer race of the ball bearing fits within an axial recess 64 of the piston 52.

At normal speeds the fly-weights 60, 60 are not strong enough to compress spring 54. However, at a predetermined excess speed the fly-weights will move rod 62 and piston 52 to the right as shown in Fig. 1 and thus cut off the flow of fluid through passageways 44 and 46.

An end block 65 is fitted over the free end of the regulator housing 13 and carries an axial journal bearing 66. This has a central longitudinal passageway for a plunger 67 with an enlarged head 68. The head 68 has a sliding fit with the axial passageway 50 in valve 49.

The opposite end of the plunger 67 projects into a casing 69 mounted on the end block 65. This casing has an outlet connection 70 to atmosphere. An aneroid bellows 71 is mounted on the inner end of the plunger 67 and expansively supported within the casing 69 by being mounted on an adjustment screw 72. Screw 72 projects axially of the casing 69 and is locked into position by lock nut 73.

By this arrangement of the flow-adjusting valve 32, the alternative valves 37 and 40 and the conjointly operating valves 49 and 68, there is a normally open vent or by-pass of the main fuel valve. The valve 40 is primarily intended for coarse calibration or setting of the vent flow when the valve 32 is fully open and any desired adjustments have been made in the setting of the valves 49 and 68. From Figure 8 it is apparent that the valve 40 has a relatively short tapered seating surface. Being relatively short, this tapered seating surface provides a rather coarse adjustment for the amount of the valve opening. However, as shown in Figure 5, the valve 37 has a long tapered seating surface which will permit a very fine adjustment of the fluid flow. Thus in making a setting, the valve 40 is set to an approximately correct position and the final setting is then made with the more sensitive valve 37. The two valves serve to complement each other in determining the final adjustment of the fluid flow since the passages which they control are in parallel.

This combination renders the control of the pressure in the chamber 20 more sensitive. Main valve 25 is therefore more responsive to variations in the relative positions of the several valves. This sensitivity would not be possible by reliance solely on "cut-off" valve 32 and the rough adjustment of valve 40.

The above description will indicate the mode of operation of this improved regulating means. A metered flow of fuel under high pressure passes metering valve 29 and fills the chamber 20 in the rear of the piston valve 25. As this flow exerts pressure on a greater area of the valve than is exposed to the incoming fuel in the throat 16, the valve is held down into closed position as shown in Fig. 2.

Discharge from the chamber 20 through pipes 28 and 31 is made possible by having the latter pipes of greater capacity than the discharge through the metering valve 29. In this way free discharge from the upper part of chamber 20 reduces the pressure therein and causes the valve 25 to rise against spring 27. Fuel pressure is thereupon exerted on the entire lower surface of valve 25 and its rise is continued. At this point fuel passes through the open valve and out the port 18.

The degree to which valve 25 rises is determined by the extent of opening of throttle valve 37, as the latter will discharge a greater or less volume of motive fuel as compared with the flow through the valve 29.

In order to increase the responsiveness to throttle valve 37 and facilitate the latter calibration, by-pass 40 may be adjusted to discharge a part of the flow coming through pipe 31.

Cut-off valve 32 may be closed and thus discharge prevented so that the flow through metering valve 29 immediately restores a balance of pressure against valve 25 and permits spring 27 to close the valve.

With high barometric pressure at low altitude, the aneroid bellows 71 is relatively collapsed and the pilot flow of fuel through passageway 44 is freely discharged through the governor valve 49 and passageways 46 and 48 to outlet port 18.

By reduction in atmospheric pressure by increase in altitude, the aneroid expands and brings the valve plunger 68 into restricting or closing position with respect to the port 50 in governor valve 49. There is thus a close relation imposed upon the flow of fuel through the system from pipe 28 to pipe 46 resulting in restriction of the main fuel valve 25. In the event that the rotational speed of the turbo-jet engine becomes excessive, the governor rod 62 is forced to the right in Fig. 1. This hastens the moment when plunger 68 will restrict or cut off flow of the controlling fuel stream. Extreme movement of the governor valve 49 will also cut off flow through pipes 44 and 46.

In this manner the pilot flow system from the inlet through pipe 28 and venting through pipe 48 to the outlet, serve as means for directly throttling the main fuel valve 25 through the throttle valve 37 and subject to close regulation as to governor speed and atmospheric pressure due to altitude.

The preferred form of the invention having been described by way of example, the invention, however, is deemed to cover various changes in minor details of structure and design without departing from the invention as defined in the following claims.

What we claim is:

1. In combination a valve body having a chamber one end of which forms a valve seat, an outlet fitting having a tubular projection forming a valve seat centrally of said first valve seat, a fuel inlet port to the annular space between said valve seats, a main valve freely slidable in said chamber, a valved passageway for conducting a metered flow of fuel under pressure from the inlet to the chamber in the rear of the valve, conducting means for freely venting the rear of the chamber to the outlet, a throttle valve interposed in said conducting means, a regulator valve in said conducting means and an aneroid bellows operatively connected to the regulator valve for actuating the said regulator valve.

2. In combination a valve body having a chamber one end of which forms a valve seat, an outlet fitting having a tubular projection forming a valve seat centrally of said first valve seat, a fuel inlet port to the annular space between said valve seats, a main valve freely slidable in said chamber, a valved passageway for conducting a metered flow of fuel under pressure from the inlet to the chamber in the rear of the valve, conducting means for freely venting the rear of the chamber to the outlet, a throttle valve interposed in said conducting means, a regulator valve in said conducting means, an aneroid bellows operatively connected to the regulator valve for actuating the said regulator valve and a speed governor cooperating with the regulator valve for modifying the actuation of the said regulator valve.

3. In combination a valve body having a chamber one end of which forms a valvet seat, an outlet fitting having a tubular projection forming a valve seat centrally of said first valve seat, a fuel inlet port to the annular space between said valve seats, a main valve freely slidable in said chamber, a spring for holding the valve down against the valve seats, a valved passageway for conducting a metered flow of fuel under pressure from the inlet to the chamber in the rear of the valve, conducting means for freely venting the rear of the chamber to the outlet, a throttle valve interposed in said conducting means, an adjustable by-pass around said throttle valve, a regulator valve in said conducting means following said throttle valve, and an aneroid bellows operatively connected to the regulator valve for actuating the said regulator valve.

4. In combination a valve body having a chamber one end of which forms a valve seat, an outlet fitting having a tubular projection forming a valve seat centrally of said first valve seat, a fuel inlet port to the annular space between said valve seats, a main valve freely slidable in said chamber, a spring for holding the valve down against the valve seats, a valved passageway for conducting a measured flow of fuel under pressure from the inlet to the chamber in the rear of the valve, conducting means for freely venting the rear of the chamber to the outlet, a throttle valve interposed in said conducting means, a regulator valve in said conducting means, an aneroid bellows operatively connected to the regulator valve for actuating the said regulator valve and a speed responsive valve seat coacting with said regulator valve for modifying the action of said regulator valve.

5. In combination a regulator housing, a valve body and a valve cover member, means for attaching the body and member to the housing, a freely movable main fuel valve in the body, means for conducting a measured volume of fuel under pressure against the rear of the valve to hold the latter in closed position, means for freely venting said fuel through the cover member and regulator housing and thence to the outlet from the valve body, a regulator valve on the housing interposed in said venting means and an aneroid bellows operatively connected to the regulator valve for actuating the said regulator valve, and a speed responsive valve seat cooperating with the regulator valve for modifying the action of said regulator valve.

ROBERT H. DAVIES.
EMMETT C. HARTLEY.

REFERENCES CITED

The following references are of record in the file of this patent:

UNITED STATES PATENTS

| Number | Name | Date |
|---|---|---|
| 822,887 | Emmet | June 5, 1906 |
| 974,266 | Hennebohle | Nov. 1, 1910 |
| 996,346 | Keen | June 27, 1911 |
| 1,154,591 | Dodge | Sept. 21, 1913 |
| 2,223,115 | McDermott | Nov. 26, 1940 |
| 2,324,579 | Hart | July 20, 1943 |
| 2,426,900 | Parker | Sept. 2, 1947 |
| 2,484,848 | Paget | Oct. 18, 1949 |

FOREIGN PATENTS

| Number | Country | Date |
|---|---|---|
| 720,860 | France | Dec. 12, 1931 |
| 762,114 | France | Jan. 18, 1934 |